(12) United States Patent
Ahle

(10) Patent No.: US 10,086,805 B2
(45) Date of Patent: Oct. 2, 2018

(54) LAND VEHICLE

(71) Applicant: HOERBIGER AUTOMATISIERUNGSTECHNIK HOLDING GMBH, Altenstadt (DE)

(72) Inventor: Alexander Ahle, Falkenstein (DE)

(73) Assignee: HOERBIGER AUTOMATISIERUNGSTECHNIK HOLDING GMBH, Altenstadt (DE)

( * ) Notice: Subject to any disclaimer, the term of this patent is extended or adjusted under 35 U.S.C. 154(b) by 52 days.

(21) Appl. No.: 15/358,656

(22) Filed: Nov. 22, 2016

(65) Prior Publication Data

US 2017/0072918 A1    Mar. 16, 2017

Related U.S. Application Data

(63) Continuation of application No. PCT/EP2015/073164, filed on Oct. 7, 2015.

(30) Foreign Application Priority Data

Oct. 7, 2014   (DE) .................. 10 2014 014 586

(51) Int. Cl.
  *B60S 9/10*    (2006.01)
  *F15B 11/16*   (2006.01)
  *F15B 20/00*   (2006.01)

(52) U.S. Cl.
  CPC ............. *B60S 9/10* (2013.01); *F15B 11/16* (2013.01); *F15B 20/00* (2013.01); *F15B 2211/205* (2013.01); *F15B 2211/7051* (2013.01)

(58) Field of Classification Search
  CPC ...... B60S 9/10; B60S 9/00; B60S 9/02; F15B 11/16; F15B 11/17; F15B 20/00; F15B 2211/205; F15B 2211/7051
  (Continued)

(56) References Cited

U.S. PATENT DOCUMENTS 3,144,138 A * 8/1964 Brown .................. B60S 9/10
                                                     212/304
3,442,530 A   5/1969 Guinot
(Continued)

FOREIGN PATENT DOCUMENTS

DE   78 06 499 U1   10/1978
GB   2 109 322 A     6/1983
GB   0 163 544 A2   12/1985

OTHER PUBLICATIONS

International Search Report issued for corresponding International Patent Application No. PCT/EP2015/073164 dated Dec. 3, 2015.

*Primary Examiner* — John D Walters
(74) *Attorney, Agent, or Firm* — Myers Wolin, LLC

(57) ABSTRACT

A land vehicle is provided comprising a chassis and a plurality of corner post units mounted on the chassis, each corner post unit includes a support member that is mounted on the chassis, an intrinsically rigid support arm that is hinged to the support member so as to be able to pivot about a substantially horizontal axis, and a pivoting drive for the support arm. According to the invention, each of the corner post units comprises at least one hydraulic cylinder-piston unit, one end of which is hinged to the support member and the other end of which is hinged to the support arm, and a hydraulic unit that acts directly on the cylinder-piston unit and is arranged on the support member.

11 Claims, 3 Drawing Sheets

(58) Field of Classification Search
USPC .......................................... 280/764.1, 763.1
See application file for complete search history.

(56) References Cited

U.S. PATENT DOCUMENTS

| | | | |
|---|---|---|---|
| 6,089,603 A | 7/2000 | Ackley | |
| 6,227,569 B1* | 5/2001 | Dingeldein | B60S 9/10 |
| | | | 212/304 |
| 2003/0001373 A1 | 1/2003 | Slater et al. | |

* cited by examiner

LAND VEHICLE

CROSS REFERENCE TO RELATED APPLICATIONS

This application is a continuation under 35 U.S.C. § 120 of International Application PCT/EP2015/073164, filed Oct. 7, 2015, which claims priority to German Application 10 2014 014 586.7, filed Oct. 7, 2014, the contents of each of which are incorporated by reference herein.

FIELD OF THE INVENTION

The present invention relates to a land vehicle with a chassis and a multiplicity of corner bracing units attached thereto, each of which comprises a bearing member mounted on the chassis, an inherently rigid bracing leg linked to this with the ability to pivot around a substantially horizontal axis and a pivoting drive for the bracing leg.

BACKGROUND

For various land vehicles, it is important that they can be leveled in parked condition (on a ground surface) and can be stabilized in the leveled position. This is the case in particular for camping vehicles, especially for mobile homes. For this purpose, several corner bracing units, each of which comprises a bracing leg that can be lowered onto the ground surface, are provided on the land vehicles in question.

Such corner bracing units are known in various structural forms. In this respect, a distinction can be made in particular as to whether a bracing leg with fixed, predetermined length (e.g. DE 7806499 U, U.S. Pat. No. 6,089,603 A, EP 163544 A, GB 2109322 A, US 2003/0001373 A1) or else a bracing leg of variable length is used. In the said latter case, the bracing legs may comprise in particular several elements capable of being displaced longitudinally (e.g. by hydraulic means) relative to one another—in the manner of a telescope—or else several members connected to one another in hinged relationship—in the manner of a scissors jack—wherein the bracing leg in question with variable length can additionally be mounted with the ability to pivot (between an operating position and a stowed position) around a substantially horizontal axis. For corner bracing units with a bracing leg that has a fixed predetermined length, the bracing leg is regularly, as indicated in the introduction, mounted with the ability to pivot around a substantially horizontal axis. In order to brace the land vehicle on the ground surface, the bracing leg is pivoted from its raised stowed position into its lowered operating position, until it is seated on the ground surface with a foot (which may be hinged) disposed at its end and the land vehicle—in combination with its further corner bracing units—is leveled and stabilized in the leveled position.

Spindle drives are widely used for pivoting the bracing legs of corner bracing units. This is the case in particular for corner bracing units of the type indicated in the introduction with a bracing leg that is inherently rigid, i.e. cannot be varied in length. In this situation, the more or less horizontally oriented spindle of the spindle drive in question can typically be turned by means of a hand crank that can be fitted onto one end of the spindle. Between a spindle nut, which is disposed on the spindle (which is subjected to tension) and the bracing leg, a swinging arm subjected to pressure then acts that is connected in hinged relationship with both parts. Otherwise, for increased comfort, comparable corner bracing units are equipped with a hydraulic cylinder-and-piston unit in such a way that the spindle is replaced respectively by a hydraulic cylinder. The hydraulic cylinders are supplied by a common, central hydraulic assembly with an electrically driven pump, wherein a central control and operating unit acts on a valve group (if necessary, automatically, using signals of position sensors) in order to pressurize the individual hydraulic cylinders separately according to need.

A land vehicle, which in addition to the features indicated in the introduction, is characterized in that each of the corner bracing units comprises at least one hydraulic cylinder-piston unit linked at its ends on the one hand to the bearing member and on the other hand to the bracing leg, is known from US 2003/0001373 A1.

SUMMARY

Against the background of this prior art, the task of the present disclosure is to provide an improved land vehicle of the type indicated in the introduction, wherein the leveling system, comprising a multiplicity of corner bracing units and serving for leveling of the vehicle and for stabilizing it in the leveled position is designed to be particularly lightweight, compact and reliable, wherein further the leveling system is designed to be retrofittable as easily as possible and with little time and effort, wherein it is further intended in the spirit of relatively low installation and retrofitting costs that one and the same available leveling system is suitable—with only relatively low adaptation time and effort—for mounting on different vehicles.

The foregoing task, which is complex because of partial conflicts between the individual sub-objectives, is accomplished by the land vehicle specified in the claims. Accordingly, the inventive land vehicle, provided with a chassis and a multiplicity of corner bracing units, which are attached thereto and which respectively comprise a bearing element mounted on the chassis and a bracing leg linked thereto in with the ability to pivot around a substantially horizontal axis, is characterized in particular in that each of the corner bracing units comprises at least one hydraulic cylinder-piston unit linked at its ends on the one hand to the bearing member and on the other hand to the bracing leg as well as a hydraulic assembly disposed on the bearing member and directly pressurizing this at least one cylinder-piston unit. Completely surprisingly, the construction of the leveling system characteristic of the inventive land vehicle is manifested in a series of advantages relevant in practice. Thus the individual corner bracing units can have very compact construction, even though each individual one of them comprises its own hydraulic assembly, supplying only the at least one hydraulic cylinder-piston unit of this corner bracing unit. A contribution to this is made by the fact that the at least one hydraulic cylinder-piston unit acts directly between the bearing member—mounted on the chassis of the land vehicle—and the bracing leg. A connecting swinging arm is not provided. Thus extension of the piston rod of the at least one hydraulic cylinder-piston unit brings about lowering of the associated bracing leg; or, in other words, the at least one hydraulic cylinder-piston unit is subjected to pressure. Consequently, the piston working chamber is pressurized for bracing of the land vehicle, but not the piston-rod working chamber. Thus the necessary force can be supplied by a very compact hydraulic cylinder-piston unit. In addition, especially with regard to land vehicles parked in leveled condition for a long time, it must be emphasized that hydraulic fluid can be trapped more reliably under high pressure in the piston working chamber (sealed by only one sliding seal) than in the piston-rod working chamber (sealed by two sliding seals). Therefore, and also because a central hydraulic assembly with hydraulic lines connecting the individual corner bracing units is not provided, the leveling system used in the inventive land vehicle can be operated with a higher hydraulic pressure than known hydraulic leveling systems. This in turn permits the use of quite particularly compact hydraulic cylinder-piston units. The fact that no hydraulic lines have to be routed in the land vehicle to be equipped with the corner bracing units is additionally an aspect advantageous in several other respects. Thus the mounting time and effort can be minimized. In particular, no pressure or leak test is needed with the leveling system assembled in the workshop, because the connections—of the decentralized hydraulic assemblies—to the respective directly associated hydraulic cylinder-piston units can be made in the factory of the manufacturer of the complete corner bracing units. And no hydraulic lines are present in the undercarriage region of the vehicle exposed to the danger of stone impacts.

According to a first preferred embodiment, the axis of the at least one hydraulic cylinder-piston unit includes an acute angle with the prolongation of the bracing leg over the entire pivoting range of the bracing leg. This is very significant in view of the desired particular compactness of the corner bracing unit, just as it represents an important aspect with respect to the possible universal usability of the corner bracing units in the most diverse vehicles characterized by the most varied installation situations. The fact that sufficient bracing forces can be supplied even under these geometric conditions for many common applications is in turn related to the possibility, explained in the foregoing, of working with particularly high hydraulic pressures. Also related to the particularly favorable geometry of the respective corner bracing unit as explained in the foregoing is the fact that preferably the offset between the linkage of the bracing leg to the bearing member and that of the hydraulic cylinder-piston unit to the bearing member is much smaller than the offset between the linkage of the bracing leg to the bearing member and that of the hydraulic cylinder-piston unit to the bracing leg.

Another preferred embodiment is characterized in that the bracing leg is bifurcated close to the bearing member and has two branches, wherein the at least one hydraulic cylinder-piston unit is disposed at least partly in the intermediate space between the two branches. The positioning, protected in this way, of the at least one hydraulic cylinder-piston unit favors reliability, because the risk of damage to the hydraulic cylinder-piston unit by stone impact and/or by objects thrown up from the roadway is minimized. In addition, particularly favorable static conditions can be achieved in this case, specifically by the fact that the bracing leg is linked to the bearing member at two hinge points spaced apart from one another, wherein the at least one hydraulic cylinder-piston unit is linked to the bearing member between the two hinge points.

According to yet another preferred embodiment, the bearing member is of shell-shaped construction and encloses at least partly a space in which the hydraulic assembly is disposed. The extremely protected positioning of the hydraulic assembly achieved hereby likewise has a positive effect on the reliability and longevity of the leveling system. With regard to the most compact dimensions possible of the bearing member, it is advantageous in this case when the hydraulic assembly is extended, relative to the linkage point of the bracing leg on the bearing member, on both sides thereof.

It is further advantageous when the at least one hydraulic cylinder-piston unit is of double-acting construction and the hydraulic assembly is of reversible construction, wherein no valves of any kind are provided in the hydraulic system between the hydraulic assembly and the at least one hydraulic cylinder-piston unit. The fact that hereby there is no need for a valve block containing controllable valves is yet another aspect in favor of minimum dimensions of the corner bracing units. And advantages are additionally achieved with respect to reliability. Depending on the specified use, however, it is possible to provide, for example, between the hydraulic assembly and the hydraulic cylinder-piston unit, a (unlockable) non-return valve, which traps the hydraulic fluid in the working chamber of the cylinder-piston unit that is important for lowering of the bracing leg, in order to stabilize the land vehicle in the leveled position for a long time. Besides hydraulic unlocking of the non-return valve (to release the bracing leg), the capability of unlocking this mechanically may also be provided, especially as part of an emergency release system.

An alternative preferred embodiment, which is suitable for supplying particularly high bracing forces, is characterized—in contrast to the first preferred improvement explained in the foregoing—in that the bearing member has an extension piece, on which the at least one hydraulic cylinder-piston unit of the corner bracing unit in question is mounted in hinged relationship at its end, wherein the offset between the linkage of the bracing leg to the bearing member and the linkage of the hydraulic cylinder-piston unit to the bearing member is larger than the offset between the linkage of the bracing leg to the bearing member and the linkage of the hydraulic cylinder-piston unit to the bracing leg.

The preferred technical aspects explained in further detail can also be achieved with great advantage in this improvement, such as the bifurcated construction of the bracing leg close to the bearing member, especially with a linkage of the bracing leg to the bearing member at two hinge points spaced apart from one another, as well as the at least partly shell-shaped construction of the bearing member to the effect that it at least partly encloses a space in which the hydraulic assembly is disposed.

BRIEF DESCRIPTION OF THE DRAWINGS

The present invention will be explained in more detail hereinafter on the basis of two preferred exemplary embodiments, illustrated in the drawings, of the corner bracing units that can be used in an inventive land vehicle. In view of the numerous publications—which are incorporated by reference as content of the present disclosure—documenting the prior art of land vehicles as such equipped with corner bracing units (see hereinabove), the entire land vehicle equipped with several of such corner bracing units is not illustrated therein, because this is not necessary for understanding of the invention.

DETAILED DESCRIPTION OF THE PREFERRED EMBODIMENTS

Figure 1:
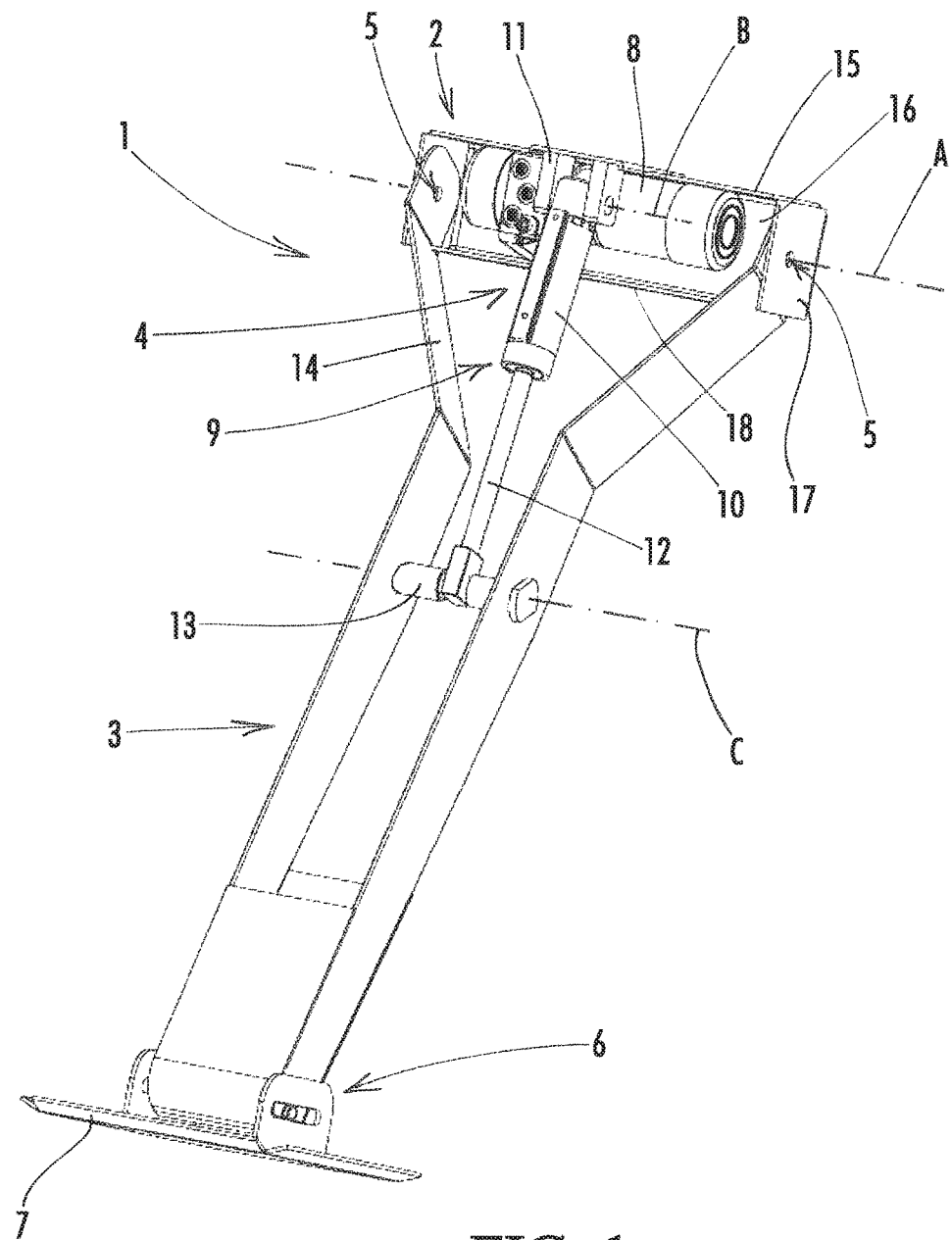
FIG. 1 shows in a first.
Figure 2:
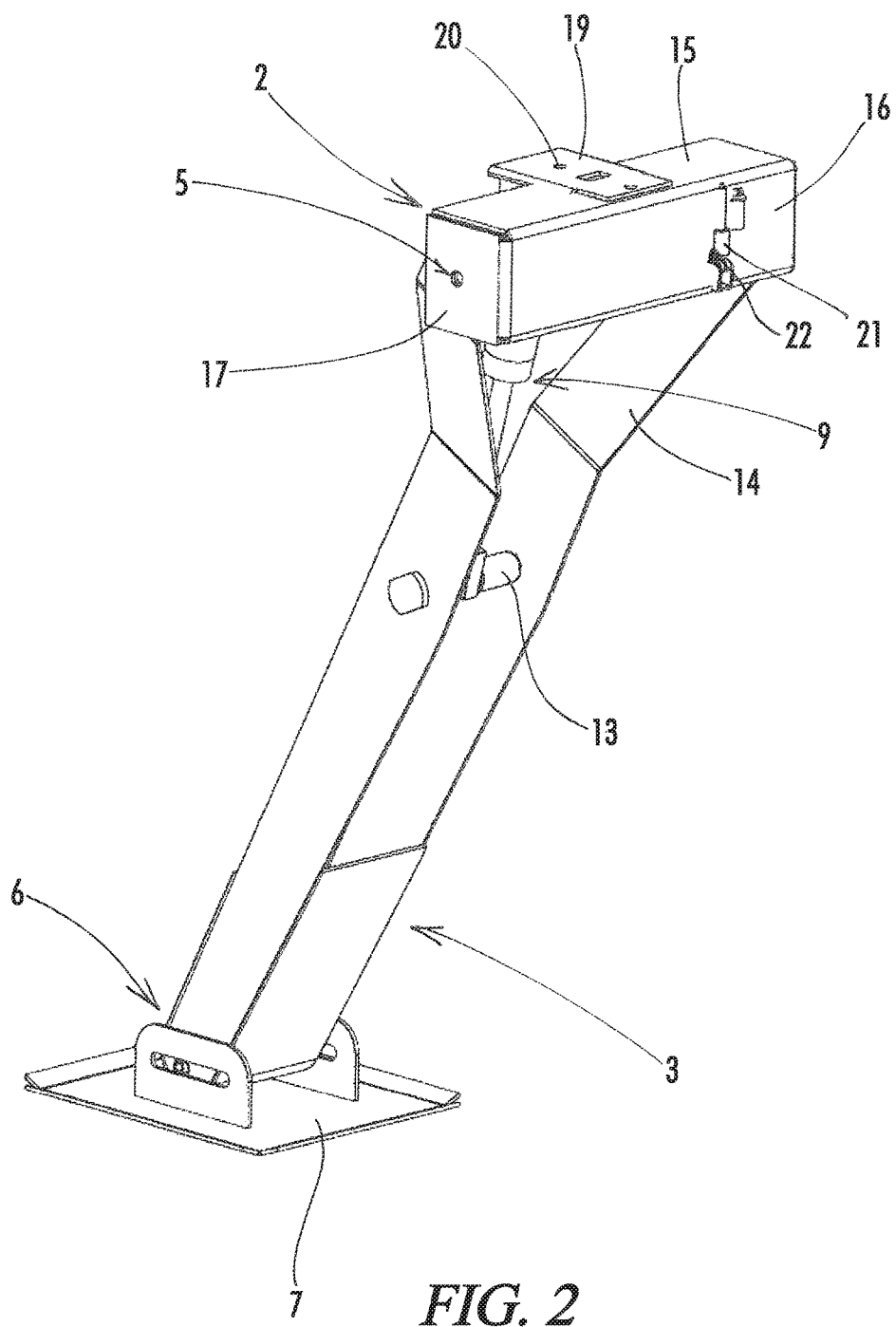
FIG. 2 shows in a second view a first preferred exemplary embodiment of such a corner bracing unit and FIG. 3 shows a second preferred exemplary embodiment of such a corner bracing unit.

Corner bracing unit 1 shown in FIGS. 1 and 2 comprises three main components, namely a bearing member 2, a bracing leg 3 and a pivoting drive 4. Bearing member 2 is constructed and suitable for fastening of corner bracing unit 1 to the chassis of a land vehicle and has fastening elements (bores, etc.) provided for this purpose. Bracing leg 3 is linked to it with the ability to pivot around a substantially horizontal axis A. Bracing leg 3 is inherently rigid, i.e. during operation it changes neither its length nor its geometry. Close to bearing member 2, and in the direction thereof, it is bifurcated to form a Y-shaped expansion, so that it is linked to bearing member 2 at two hinge points 5 spaced apart from one another. At its free end 6 opposite the linkage to bearing member 2, bracing leg 3 has a bracing foot 7 attached in hinged and displaceable relationship.

Pivoting drive 4 for bracing leg 3 comprises a hydraulic assembly 8 disposed on bearing member 2 and a hydraulic cylinder-piston unit 9 directly pressurized by this. The latter is linked at its ends on the one hand to bearing member 2 and on the other hand to bracing leg 3. In this case, cylinder 10 of the cylinder-piston unit is attached in hinged relationship to bearing member 2, for which purpose two bearing brackets 11 are disposed thereon approximately midway between the two hinge points 5; and piston rod 12 of cylinder-piston unit 9 is connected at its ends—also in hinged relationship—with hinge pins 13 of bracing leg 3. Hinge axes B and C of the hinged linkage of cylinder-piston unit 9 to bearing member 2 and to bracing leg 3 respectively are then parallel to one another and to pivoting axis A of bracing leg 3. In this case, the geometric conditions are chosen such that the offset between pivoting axes A and B of the hinged linkage of bracing leg 3 to bearing member 2 and the hinged linkage of hydraulic cylinder-piston unit 9 to bearing member 2 is substantially smaller than the distance of pivoting axis C of the hinged linkages of cylinder-piston unit 9 on support leg 3 from pivoting axis A of the linkage of support leg 3 on bearing member 2. Over the entire pivoting range of support leg 3, the axis of hydraulic cylinder-piston unit 9 encloses an acute angle with the prolongation of the bracing leg. To protect it against damage, hydraulic cylinder-piston unit 9 is disposed in the intermediate space between the two branches 14 of bracing leg 3.

For protected positioning of hydraulic assembly 8 and bearing member 2, the latter has shell-shaped construction. It comprises an upper wall 15, a side wall 16, two end walls 17 and a lower wall 18, wherein the two hinge points 5 are defined at the two side walls 17. By virtue of the shell-shaped geometry, bearing member 2 encloses at least partly a space in which—extending on both sides of bearing brackets 11—hydraulic assembly 8 is disposed. By an additional wall, which can be disposed opposite side wall 16, the protection of hydraulic assembly 8 could be even further improved. For the same purpose, shielding elements, which more or less seal the space enclosed by bearing member 2, at least when bracing leg 3 is pivoted up, could also be provided on bracing leg 3 close to bearing member 2.

In FIG. 2 it can be seen that a connecting plate 19 is attached to upper wall 15 of bearing member 2. This not only supports the two bearing brackets 11. To the contrary, it also has bores 20 serving for fastening of the corner bracing unit to the vehicle chassis. Furthermore, opening 21 disposed in side wall 16 of bearing member 2 is visible and serves for passage of a power cable 22 supplying hydraulic assembly 8.

Bracing leg 3 is not only lowered hydraulically—by extending piston rod 12 of hydraulic cylinder-piston unit 9. To the contrary, it is also raised hydraulically. For this purpose hydraulic cylinder-piston unit 9 is of double-acting construction and hydraulic assembly 8 is of reversible construction, so that it is possible to change over between lowering and raising of bracing leg 3 merely by reversing the motor of hydraulic assembly 8.

Figure 3:
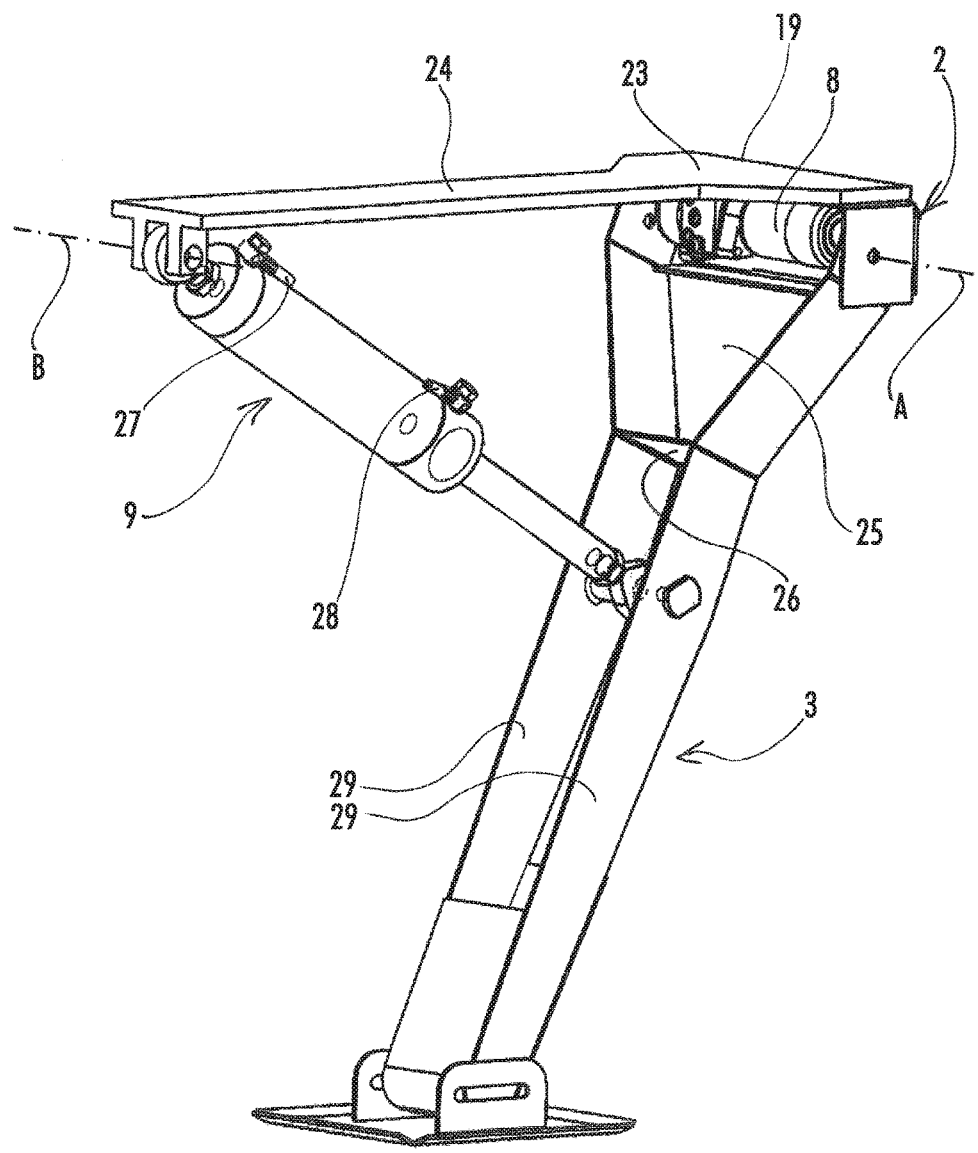

In the exemplary embodiment shown in FIG. 3, connecting plate 19, on which hydraulic cylinder-piston unit 9 is mounted in hinged relationship around pivoting axis B, is constructed as base plate 23 of bearing member 2 and is prolonged in such a way compared with the first exemplary embodiment that bearing member 2 has an extension piece 24. In this case the offset between the linkage of bracing leg 3 to bearing member 2 and the linkage of hydraulic cylinder-piston unit 9 to bearing member 2 is considerably larger than the offset between the linkage of bracing leg 3 to bearing member 2 and the linkage of hydraulic cylinder-piston unit 9 to bracing leg 3.

Especially in its bifurcated region, bracing leg 3 can be provided between its two branches 14 with a cover 25 joining these to one another. This not only achieves considerable stiffening of bracing leg 3. To the contrary—in the pivoted-up position of the bracing leg—the said cover 25, together with the two branches 14 of bracing leg 3 (as well as a closure plate 26 extending between these if necessary) and base plate 23 of bearing member 2 more or less hermetically seal the space defined by the shell-shaped part of the bearing member and containing hydraulic assembly 8. During travel movement of the land vehicle, hydraulic assembly 8 is optimally protected in this way from damage and dirt.

By a prolongation of cover 25 downward in the direction of foot 6, so that a U-shaped cross section is formed together with the two side plates 29 of bracing leg 3 for this (below the bifurcation), substantial encapsulation of cylinder-piston unit 9 inside the cavity enclosed by extension piece 24 and bracing leg 3 can be achieved when bracing leg 3 is raised, so that cylinder-piston unit 9 is also optimally protected against dirt and damage when the bracing leg is raised.

The hydraulic lines connecting hydraulic assembly 8 with cylinder-piston unit 9 can be permanently installed in the factory. They may even be constructed—not shown—as rigid pipes, namely by making both ports 27, 28 of cylinder-piston unit 9 as hydraulic hinged couplings with hinge axes aligned with pivoting axis B of cylinder-piston unit 9. Appropriate recesses may be provided in closure plate 26 for passage of the said pipes.

In other respects, the structure and the function of the exemplary embodiment illustrated in FIG. 3 follow from the foregoing explanations of FIGS. 1 and 2.

What is claimed is:

1. A land vehicle with a chassis and a multiplicity of corner bracing units (1) attached thereto, each of which comprises:
    a bearing member (2) mounted on the chassis,
    an inherently rigid bracing leg (3) linked to the bearing member with the ability to pivot around a substantially horizontal axis (A) and
    a pivoting drive (4) for the bracing leg,
    wherein each of the corner bracing units (1) comprises at least one hydraulic cylinder-piston unit (9) linked at the ends of the cylinder-piston unit on a first end to the bearing member (2) and on a second end to the bracing leg (3), characterized in that each of the corner bracing units (1) further comprises a hydraulic assembly (8) disposed on the bearing member (2) and directly pressurizing the at least one cylinder-piston unit (9).

2. The land vehicle of claim 1, wherein the axis of the at least one hydraulic cylinder-piston unit (9) includes an acute angle with the prolongation of the bracing leg (3) over the entire pivoting range of the bracing leg (3).

3. The land vehicle of claim 1, wherein the bracing leg (3) is bifurcated close to the bearing member (2) and has two branches (14), wherein the at least one hydraulic cylinder-piston unit (9) is disposed at least partly in the intermediate space between the two branches (14).

4. The land vehicle of claim 3, wherein the bracing leg (3) is linked to the bearing member (2) at two hinge points (5) spaced apart from one another, wherein the at least one hydraulic cylinder-piston unit (9) is linked to the bearing member between the two hinge points (5).

5. The land vehicle of claim 1, wherein the bearing member (2) is of shell-shaped construction and encloses at least partly a space in which the hydraulic assembly (8) is disposed.

6. The land vehicle of claim 1, wherein the hydraulic assembly (8) is extended, relative to the linkage of the at least one hydraulic cylinder-piston unit (9) on the bearing member (2), on both sides thereof.

7. The land vehicle of claim 1, wherein the offset between the linkage of the bracing leg (3) to the bearing member (2) and that of the hydraulic cylinder-piston unit (9) to the bearing member (2) is smaller than the distance of the linkage of the hydraulic cylinder-piston unit (9) on the support leg (3) from the linkage of the support leg on the bearing member (2).

8. The land vehicle of claim 1, wherein the bearing member (2) has an extension piece (24), on which the at least one hydraulic cylinder-piston unit (9) of the corner bracing unit (1) in question is mounted in hinged relationship at the first end, wherein the offset between the linkage of the bracing leg (3) to the bearing member (2) and the linkage of the hydraulic cylinder-piston unit (9) to the bearing member (2) is larger than the offset between the linkage of the bracing leg (3) to the bearing member (2) and the linkage of the hydraulic cylinder-piston unit (9) to the bracing leg (3).

9. The land vehicle of claim 1, wherein the at least one hydraulic cylinder-piston unit (9) is of double-acting construction and the hydraulic assembly (8) is of reversible construction, wherein no controllable valves of any kind are provided in the hydraulic system between the hydraulic assembly (8) and the at least one hydraulic cylinder-piston unit (9).

10. The land vehicle of claim 1, wherein extension of the piston rod (12) of the at least one hydraulic cylinder-piston unit (9) brings about lowering of the associated bracing leg (3).

11. The land vehicle of claim 1, wherein an emergency release system is provided, by means of which a bypass to the pump of the respective hydraulic assembly (8) can be opened.

* * * * *